United States Patent
Nakajima et al.

(10) Patent No.: US 9,613,036 B2
(45) Date of Patent: Apr. 4, 2017

(54) MAGNETIC TAPE DRIVE APPARATUS, MAGNETIC TAPE DRIVE SYSTEM, AND MAGNETIC TAPE DRIVE METHOD

(71) Applicant: NEC Corporation, Minato-ku, Tokyo (JP)

(72) Inventors: Makoto Nakajima, Tokyo (JP);
Hajime Nonaka, Tokyo (JP);
Muneyuki Yoshikawa, Tokyo (JP);
Yuuki Hayakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/608,746

(22) Filed: Jan. 29, 2015

(65) Prior Publication Data
US 2015/0220279 A1    Aug. 6, 2015

(30) Foreign Application Priority Data
Feb. 4, 2014    (JP) .................................. 2014-019230

(51) Int. Cl.
*G06F 17/30* (2006.01)
*G06F 3/06* (2006.01)

(52) U.S. Cl.
CPC ...... *G06F 17/30076* (2013.01); *G06F 3/0604* (2013.01); *G06F 3/0643* (2013.01); *G06F 3/0661* (2013.01); *G06F 3/0682* (2013.01)

(58) Field of Classification Search
CPC ............. G06F 17/30076; G06F 3/0617; G06F 3/0643; G06F 3/0682
See application file for complete search history.

(56) References Cited

FOREIGN PATENT DOCUMENTS

JP      2013-161185 A      8/2013

*Primary Examiner* — Yong Choe (57) ABSTRACT

A first system adaptation unit of magnetic tape drive apparatus communicates with a read/write request source based on a method adapted to a file system. A second system adaptation unit communicates data with the read/write request source based on a method adapted to a designated system other than the file system. A control unit allows the first system adaptation unit to be in a ready state when a format of a magnetic tape to be read and written is adapted to the file system and allows otherwise the first system adaptation unit to be in a not-ready state. The control unit deceives the read/write request source as if the first system adaptation unit is in the ready state even when the first system adaptation unit is in the not-ready state as well as the ready state.

10 Claims, 11 Drawing Sheets

| | MAGNETIC TAPE | | |
|---|---|---|---|
| | ABSENCE | PRESENCE | |
| | | ADAPTED TO FILE SYSTEM | UNADAPTED TO FILE SYSTEM |
| FIRST SYSTEM ADAPTATION UNIT | NOT-READY STATE | READY STATE | NOT-READY STATE |
| SECOND SYSTEM ADAPTATION UNIT | NOT-READY STATE | NOT-READY STATE | READY STATE |
| FIRST SYSTEM ADAPTATION UNIT (WHEN VIEWED FROM HOST APPARATUS) | READY STATE (PSEUDO READY STATE) | READY STATE | READY STATE (PSEUDO READY STATE) |

MAGNETIC TAPE DRIVE APPARATUS, MAGNETIC TAPE DRIVE SYSTEM, AND MAGNETIC TAPE DRIVE METHOD

This application is based upon and claims the benefit of priority from Japanese Patent Application No. 2014-019230, filed on Feb. 4, 2014, the disclosure of which is incorporated herein in its entirety by reference.

TECHNICAL FIELD

The present invention relates to a technology using a magnetic tape in a file system.

BACKGROUND ART

In a magnetic tape, it is general that writing and reading of data are performed by a sequential access method. In the sequential access method, data is sequentially written or read from the head of the magnetic tape. On the other hand, in recent years, as disclosed in Reference Literature 1 (Japanese Laid-open Patent Publication No. 2013-161185), an access method (hereinafter, also referred to as a file access method) adapted to a file system has been developed as a method for accessing a magnetic tape. Since the file access method for a magnetic tape is based on a standard regarding LTFS (Linear Tape File System), even in the case of a magnetic tape, for example, data can be read and written such that data stored in a hard disk is read and written.

A format of a magnetic tape adapted to the sequential access method is different from a format of a magnetic tape adapted to the file access method. A magnetic tape drive apparatus that reads and writes a magnetic tape has a type capable of reading and writing various kinds of magnetic tapes having formats different from the above formats. Such the magnetic tape drive apparatus operates as follows when reading and writing the magnetic tape. That is, when the magnetic tape (hereinafter, also referred to as a LTFS type magnetic tape) of the format adapted to the file access method is loaded, the magnetic tape drive apparatus generates a logical device adapted to the file system. A host apparatus (for example, a server or a PC (Personal Computer)) connected to the magnetic tape apparatus recognizes that the connected magnetic tape drive apparatus is an apparatus adaptable to the file system.

Then, when the magnetic tape is unloaded for the purpose of a change and the like of the magnetic tape, the magnetic tape drive apparatus deletes the logical device. In this way, a host apparatus does not recognize that the magnetic tape drive apparatus is the apparatus adapted to the file system. In this state, when the magnetic tape drive apparatus loads a non-LTFS type magnetic tape, no logical device is generated. Therefore, the host apparatus does not still recognize that the connected magnetic tape drive apparatus is the apparatus adapted to the file system.

On the other hand, when the magnetic tape drive apparatus loads the LTFS type magnetic tape again, the logical device is generated again, so that the host apparatus recognizes again that the connected magnetic tape drive apparatus is the apparatus adapted to the file system.

As described above, whenever the magnetic tape drive apparatus loads the LTFS type magnetic tape, the host apparatus recognizes that the magnetic tape drive apparatus is the apparatus adapted to the file system, and whenever the magnetic tape drive apparatus unloads the LTFS type magnetic tape, the host apparatus does not recognize that the magnetic tape drive apparatus is the apparatus adapted to the file system. The state in which recognition for the magnetic tape drive apparatus is frequently changed, for example, causes a problem such as complication of a control operation to the host apparatus.

SUMMARY

The present invention has been made in order to solve the problem. That is, a main object of the present invention is to provide a technology capable of preventing the situation in which recognition of a host apparatus for a magnetic tape drive apparatus is changed due to a change and the like of a magnetic tape adapted to a file system.

To achieve the object, a magnetic tape drive apparatus of the present invention includes:

a first system adaptation unit that communicates with a read/write request source, which requests reading or writing of data, based on a method adapted to a file system;

a second system adaptation unit that communicates with the read/write request source, which requests reading or writing of data, based on a method adapted to a designated system other than the file system; and a control unit that allows the first system adaptation unit to be in a ready state and the second system adaptation unit to be in a not-ready state in a case that a format of a magnetic tape to be read and written is adapted to the file system, allows the first system adaptation unit to be in the not-ready state and the second system adaptation unit to be in the ready state in a case that the format of the magnetic tape to be read and written is not adapted to the file system, and allows the first system adaptation unit and the second system adaptation unit to be in the not-ready state in a case that there is no magnetic tape to be read and written, wherein, the control unit has a function of deceiving the read/write request source as if the first system adaptation unit is in the ready state even when the first system adaptation unit is in the not-ready state as well as the ready state.

A magnetic tape drive system of the present invention includes:

a magnetic tape drive that includes a mechanism to perform data read/write for a magnetic tape; and a server apparatus that is connected to the magnetic tape drive via an information communication network and controls an operation of the magnetic tape drive, wherein the server apparatus includes:

a first system adaptation unit that communicates with a read/write request source, which requests reading or writing of data in the magnetic tape, based on a method adapted to a file system;

a second system adaptation unit that communicates with the read/write request source, which requests reading or writing of data in the magnetic tape, based on a method adapted to a designated system other than the file system; and a control unit that allows the first system adaptation unit to be in a ready state and the second system adaptation unit to be in a not-ready state in a case that a format of a magnetic tape to be read and written is adapted to the file system, allows the first system adaptation unit to be in the not-ready state and the second system adaptation unit to be in the ready state in a case that the format of the magnetic tape to be read and written is not adapted to the file system, and allows the first system adaptation unit and the second system adaptation unit to be in the not-ready state in a case that there is no magnetic tape to be read and written, wherein, the control unit has a function of deceiving the read/write request source as if the first system adaptation unit is in the ready state even when the first system adaptation unit is in the not-ready state as well as the ready state.

A magnetic tape drive method of the present invention includes:

providing a first system adaptation unit that communicates with a read/write request source, which requests reading or writing of data in a magnetic tape, based on a method adapted to a file system, and a second system adaptation unit that communicates with the read/write request source, which requests reading or writing of data in the magnetic tape, based on a method adapted to a designated system other than the file system;

allowing the first system adaptation unit to be in a ready state and the second system adaptation unit to be in a not-ready state in a case that a format of a magnetic tape to be read and written is adapted to the file system;

allowing the first system adaptation unit to be in the not-ready state and the second system adaptation unit to be in the ready state in a case that the format of the magnetic tape to be read and written is not adapted to the file system;

allowing the first system adaptation unit and the second system adaptation unit to be in the not-ready state in a case that there is no magnetic tape to be read and written; and deceiving the read/write request source as if the first system adaptation unit is in the ready state even when the first system adaptation unit is in the not-ready state as well as the ready state.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments according to the present invention will be described below with reference to the accompanying drawings.

First Exemplary Embodiment

Figure 1:
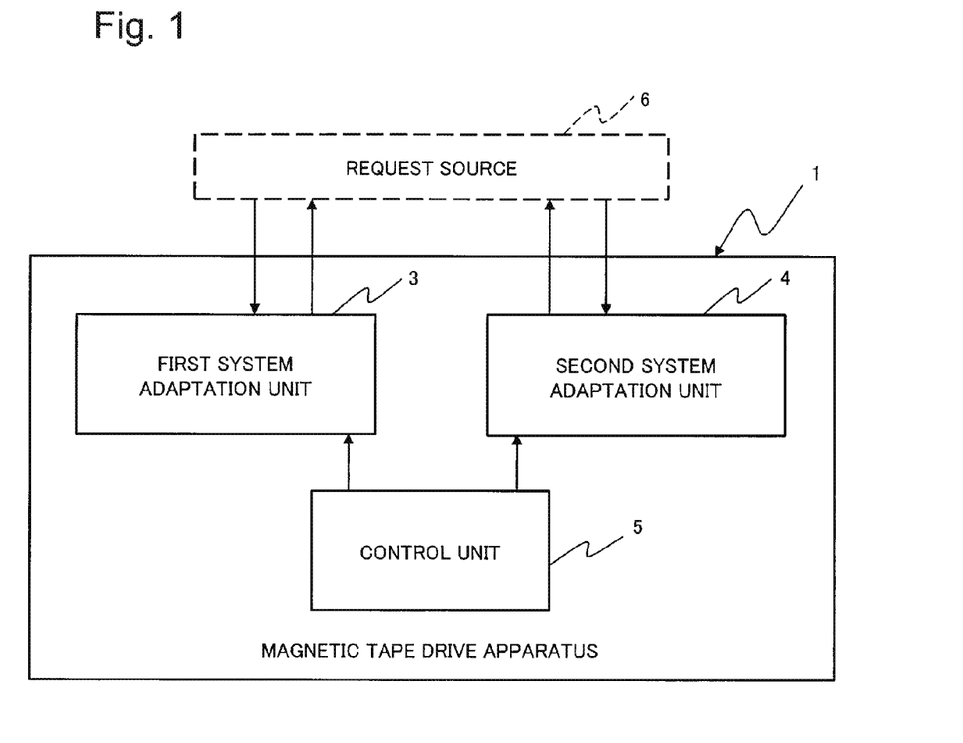
FIG. 1 is a block diagram simply illustrating a configuration of a magnetic tape drive apparatus of a first exemplary embodiment according to the present invention.

FIG. 1 is a block diagram simply illustrating a configuration of a magnetic tape drive apparatus of a first exemplary embodiment according to the present invention. A magnetic tape drive apparatus 1 of the first exemplary embodiment includes a first system adaptation unit (first system adaptation means) 3, a second system adaptation unit (second system adaptation means) 4, and a control unit (control means) 5.

The first system adaptation unit 3 has a function of communicating with a read/write request source 6, which requests a reading or writing of data, based on a method adapted to a file system.

The second system adaptation unit 4 has a function of communicating data with the read/write request source 6 based on a method adapted to a designated system other than the file system.

The control unit 5 has a function of allowing the first system adaptation unit 3 to be in a ready state and the second system adaptation unit 4 to be in a not-ready state when a format of a magnetic tape to be read and written is adapted to the file system. Furthermore, the control unit 5 has a function of allowing the first system adaptation unit 3 to be in the not-ready state and the second system adaptation unit 4 to be in the ready state when a format of a magnetic tape to be read and written is not adapted to the file system. Moreover, when there is no magnetic tape to be read and written, the control unit 5 has a function of allowing the first system adaptation unit 3 and the second system adaptation unit 4 to be in the not-ready state. Moreover, even when the first system adaptation unit 3 is in the not-ready state as well as the ready state, the control unit 5 also has a function of deceiving the read/write request source 6 as if the first system adaptation unit 3 is in the ready state.

The magnetic tape drive apparatus 1 of the first exemplary embodiment includes the control unit 5, thereby achieving the following effects. That is, in response to the presence or absence and the format of a magnetic tape to be read and written, the control unit 5 sets each of the first system adaptation unit 3 and the second system adaptation unit 4 to any one of the ready state and the not-ready state recognizable by the read/write request source 6 (a host apparatus). That is, regardless of the presence or absence of a magnetic tape or the format of the magnetic tape, the magnetic tape drive apparatus 1 deceives the read/write request source 6 as if the first system adaptation unit 3 is in the ready state, thereby allowing the first system adaptation unit 3 and the second system adaptation unit 4 to be simultaneously recognized by the read/write request source 6. Consequently, the magnetic tape drive apparatus 1 can prevent the situation in which the recognition of the read/write request source 6 to the magnetic tape drive apparatus 1 is changed due to a change and the like of a magnetic tape.

Figure 2:
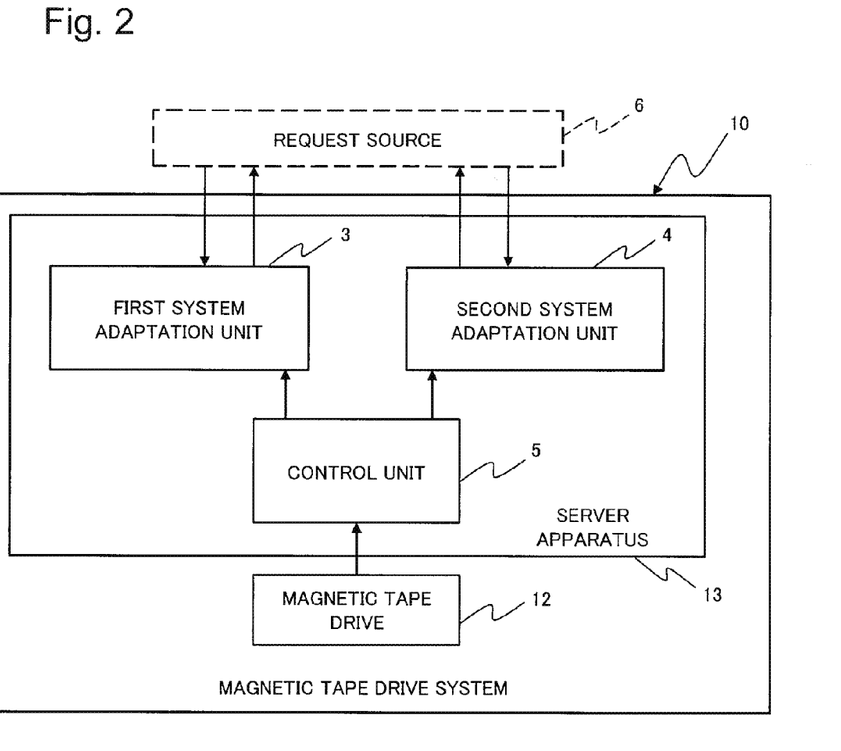
FIG. 2 is a block diagram simply illustrating a configuration of an exemplary embodiment of a magnetic tape drive system according to the present invention.

FIG. 2 is a block diagram simply illustrating a configuration example of a magnetic tape drive system according to the present invention. A magnetic tape drive system 10 includes a magnetic tape drive 12 and a server apparatus 13.

The magnetic tape drive 12 has a function of performing a reading and writing of data for a magnetic tape.

The server apparatus 13 includes the first system adaptation unit 3, the second system adaptation unit 4, and the control unit 5. The first system adaptation unit 3, the second system adaptation unit 4, and the control unit 5 have the same functions as those of the first system adaptation unit 3, the second system adaptation unit 4, and the control unit 5 of the magnetic tape drive apparatus 1 illustrated in FIG. 1.

The magnetic tape drive system 10 has a configuration in which the server apparatus 13 controls the operation of the magnetic tape drive 12 at the request of the read/write request source 6. Furthermore, the server apparatus 13 communicating with the read/write request source 6 includes the first system adaptation unit 3, the second system adaptation unit 4, and the control unit 5. Consequently, similarly to the magnetic tape drive apparatus 1 illustrated in FIG. 1, the magnetic tape drive system 10 can also prevent the situation in which the recognition of the read/write request source 6 to the magnetic tape drive 12 (the magnetic tape drive system 10) is changed due to a change and the like of a magnetic tape.

Second Exemplary Embodiment

Hereinafter, a second exemplary embodiment according to the present invention will be described.

Figure 3:
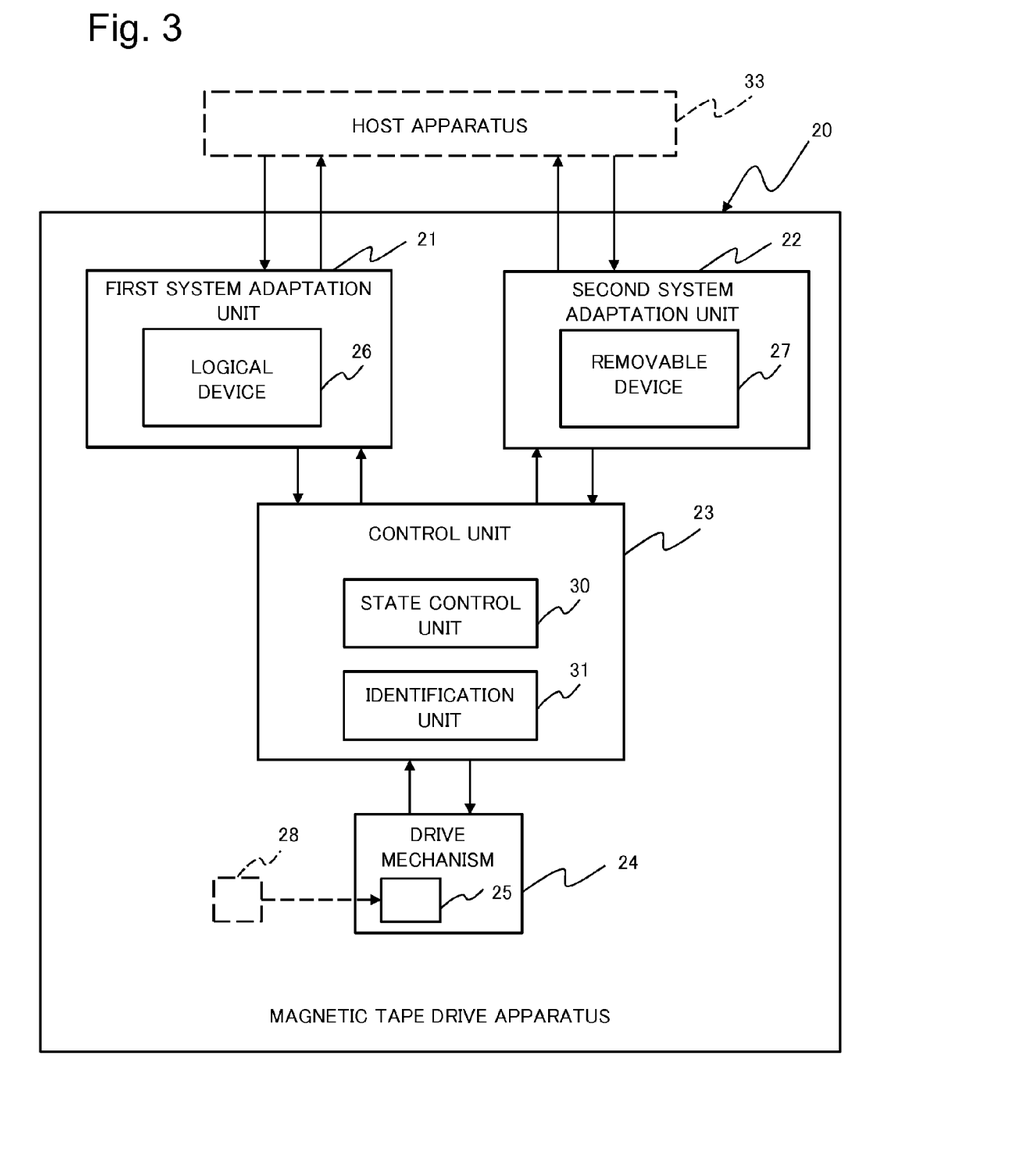
FIG. 3 is a block diagram simply illustrating a configuration of a magnetic tape drive apparatus of a second exemplary embodiment according to the present invention.

FIG. 3 is a block diagram simply illustrating a configuration of a magnetic tape drive apparatus of the second exemplary embodiment according to the present invention. A magnetic tape drive apparatus 20 is connected to a host apparatus (a data read/write request source) 33. Alternatively, the magnetic tape drive apparatus 20 is incorporated in the host apparatus 33. The magnetic tape drive apparatus 20 has a configuration of outputting (transmitting) data of a magnetic tape to the host apparatus 33 and writing data from the host apparatus 33 in the magnetic tape in response to a data read request and a data write request (a read/write request) from the host apparatus 33. Moreover, in the second exemplary embodiment, the magnetic tape drive apparatus 20 includes a first system adaptation unit (first system adaptation means) 21, a second system adaptation unit (second system adaptation means) 22, a control unit (control means) 23, and a drive mechanism 24.

The drive mechanism 24 includes a mounting unit 25, in which a magnetic tape (for example, a magnetic tape cartridge based on a LTO (Linear Tape-Open) standard) 28 is set, and a magnetic head (not illustrated) that reads and writes data from/in the magnetic tape 28. When the magnetic tape 28 is set in the mounting unit 25, the drive mechanism 24 has a function of loading the magnetic tape 28 and thus enabling data read/write for the magnetic tape 28. Furthermore, the drive mechanism 24 has a function of unloading the magnetic tape 28 in order to take out the magnetic tape 28 from the mounting unit 25.

The magnetic tape drive apparatus 20 of the second exemplary embodiment is capable of driving to a LTFS (Linear Tape File System) type magnetic tape adapted to the file system and a sequential type magnetic tape unadapted to the file system. The LTFS type magnetic tape has been initialized in the format adapted to the file system. The sequential type magnetic tape has been initialized in a format adapted to the sequential access. The magnetic tape drive apparatus 20 can read/write data from/in a plurality of types of magnetic tapes having different formats.

The first system adaptation unit 21 includes a logical device 26. Furthermore, the first system adaptation unit 21 has a function of an interface communicating with the host apparatus 33. The interface enables data communication with the host apparatus 33 by the logical device 26 based on a method adapted to the file system. In other words, the first system adaptation unit 21 communicates with the host apparatus 33 by converting data into a file. A method in which the first system adaptation unit 21 communicates with the host apparatus 33, for example, includes a method using NFS (Network File System) or CIFS (Common Internet File System).

The first system adaptation unit 21 communicates with the control unit 23 based on the sequential access method. Thus, the first system adaptation unit 21 has a function of converting a request (a request of a form (a communication mode) adapted to the file system) from the host apparatus 33 into a form (a communication mode) suitable for the control unit 23, and outputting the converted request to the control unit 23.

The second system adaptation unit 22 includes a removable device 27. The second system adaptation unit 22 has a function of an interface communicating data with the host apparatus 33. The interface enables data communication with the host apparatus 33 by the removable device 27 based on a method different from that of the first system adaptation unit 21. For example, the second system adaptation unit 22 communicates with the host apparatus 33 based on SCSI (Small Computer System Interface) having considered the sequential access. The second system adaptation unit 22 communicates with the control unit 23 based on the same method as that used in the communication with the host apparatus 33. Thus, the second system adaptation unit 22 outputs a request from the host apparatus 33 to the control unit 23 as is.

The control unit 23 has a function of controlling the operation of the drive mechanism 24 in response to the read/write request transferred from the host apparatus 33 via the first system adaptation unit 21 or the second system adaptation unit 22. Moreover, the control unit 23 includes a state control unit 30 and an identification unit 31 as functional units.

The identification unit 31 has a function of reading information of an area, where format information of the loaded magnetic tape 28 has been stored, from the drive mechanism 24. Moreover, the identification unit 31 has a function of identifying whether the format of the loaded magnetic tape 28 is the format (the file system format) adapted to the file system based on the read information, and holding the identification result until the magnetic tape 28 is unloaded.

The state control unit 30 has a function of receiving information regarding whether the loaded magnetic tape 28 exists in the drive mechanism 24, and the identification information on the format of the magnetic tape 28 obtained from the identification unit 31. The state control unit 30 has a function of controlling as follows each operation states of the first system adaptation unit 21 and the second system adaptation unit 22, and view of the operation state of the first system adaptation unit 21 in a case of viewing from the host apparatus 33, based on the received information.

Figure 4:
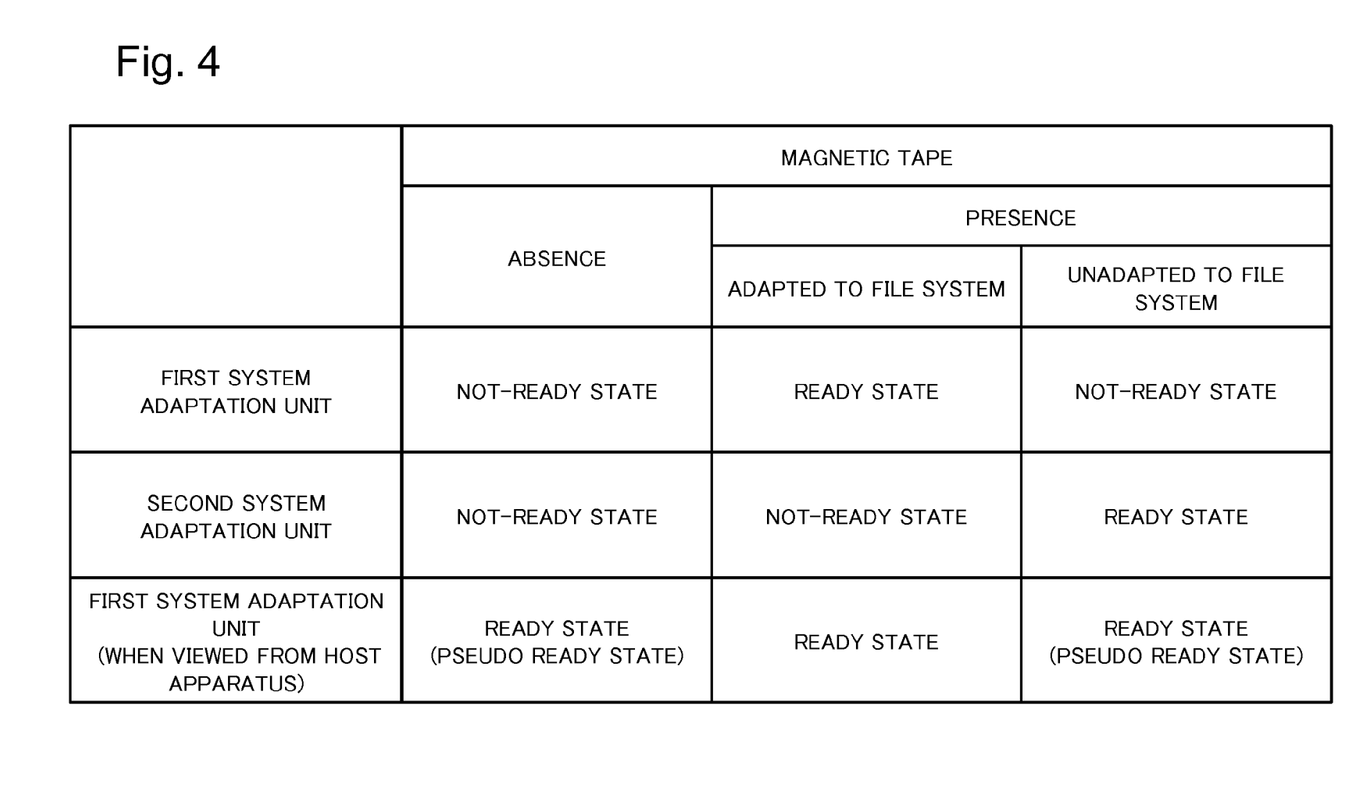
FIG. 4 is a table illustrating operations states of a first system adaptation unit and a second system adaptation unit in the second exemplary embodiment.

FIG. 4 is a table collectively illustrating the operations states of the first system adaptation unit 21 and the second system adaptation unit 22 according to the control of the state control unit 30, and the operation state of the first system adaptation unit 21 when viewed from the host apparatus 33. That is, as illustrated in FIG. 4, in a case that the loaded magnetic tape 28 exists in the drive mechanism 24 and the format of the magnetic tape 28 is the file system format, the state control unit 30 allows the first system adaptation unit 21 to be in the ready state. In this case, the state control unit 30 allows the second system adaptation unit 22 to be in the not-ready state.

In a case that the format of the loaded magnetic tape 28 is not the file system format, the state control unit 30 allows the second system adaptation unit 22 to be in the ready state. In this case, the state control unit 30 allows the first system adaptation unit 21 to be in the not-ready state. In a case that the loaded magnetic tape 28 does not exist in the drive mechanism 24, the state control unit 30 allows both the first system adaptation unit 21 and the second system adaptation unit 22 to be in the not-ready state.

The state control unit 30 has a function of controlling a notification to the host apparatus 33 such that the host apparatus 33 recognizes the operation state of the first system adaptation unit 21 (in other words, the magnetic tape drive apparatus 20) as follows. In the case that the first system adaptation unit 21 is in the ready state, the state control unit 30 transmits a notification (information), which informs that the first system adaptation unit 21 is in the ready state, to the host apparatus 33 via the first system adaptation unit 21. Then, the host apparatus 33 recognizes that the first system adaptation unit 21 is in the ready state, in other words, that read/write of data adapted to the file system are possible in the magnetic tape drive apparatus 20.

In the case that the first system adaptation unit 21 is in the not-ready state, the state control unit 30 regards the not-ready state as a pseudo ready state, and transmits a notification (information), which informs that the first system adaptation unit 21 is in the ready state, to the host apparatus 33 via the first system adaptation unit 21. The pseudo ready state is a state in which the first system adaptation unit 21 is in the ready state and there is no file and no writing capacity. Consequently, the host apparatus 33 recognizes that read/write of data adapted to the file system is not possible, but the magnetic tape drive apparatus 20 is adapted to the file system.

In the case that the second system adaptation unit 22 is in the ready state, the state control unit 30 transmits a notification (information), which informs that the second system adaptation unit 22 is in the ready state, to the host apparatus 33 via the second system adaptation unit 22. In this way, the host apparatus 33 recognizes that the magnetic tape 28 of the format (adapted to the sequential access) unadapted to the file system has been set in the magnetic tape drive apparatus 20. In the case that the second system adaptation unit 22 is in the not-ready state, the state control unit 30 transmits a notification (information), which informs that the second system adaptation unit 22 is in the not-ready state, to the host apparatus 33 via the second system adaptation unit 22. In this way, the host apparatus 33 recognizes that the magnetic tape 28 of the format (adapted to the sequential access) unadapted to the file system has not been set in the magnetic tape drive apparatus 20.

That is, by the function of the state control unit 30, the magnetic tape drive apparatus 20 can pretend, to the host apparatus 33, that the magnetic tape drive apparatus 20 is an apparatus adaptable to both of the file system and the system (the sequential access system) other than the file system.

Hereinafter, an example of a loading process and an unloading process of a magnetic tape in the magnetic tape drive apparatus 20 having the above configuration will be described with reference to FIG. 5 and FIG. 6.

Figure 5:
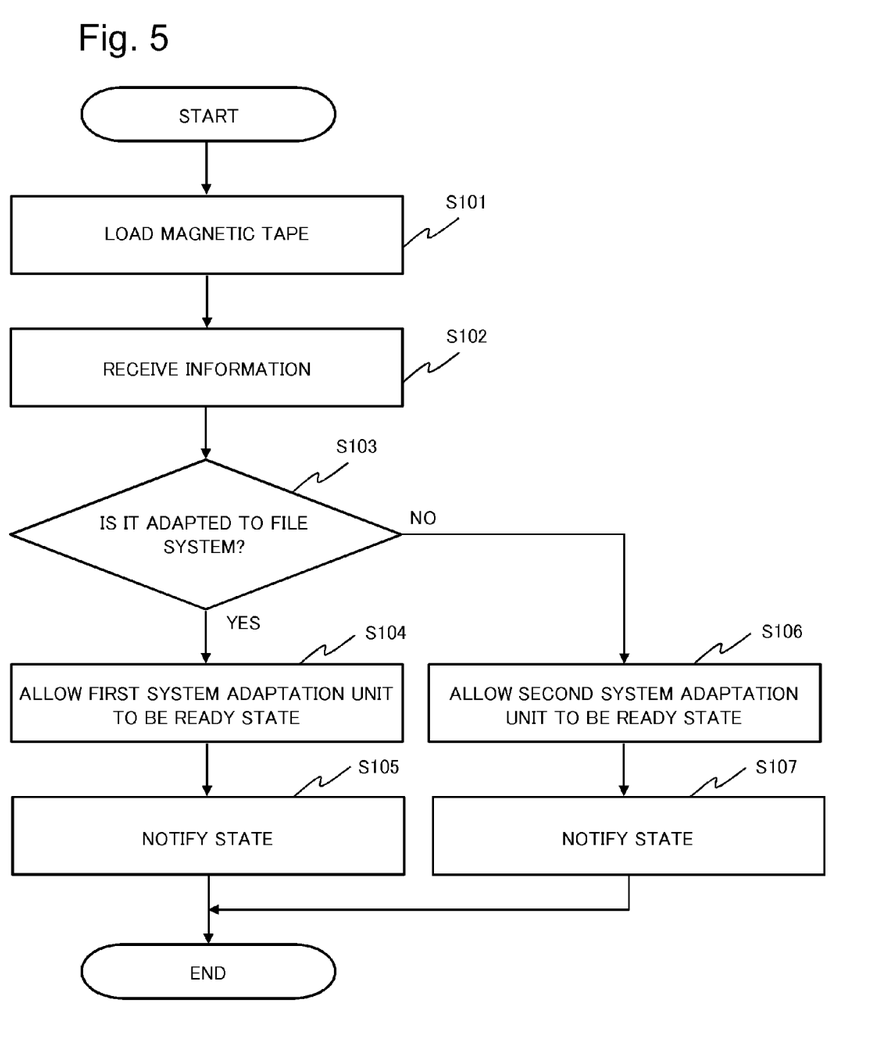
FIG. 5 is a flowchart illustrating an example of a loading process of a magnetic tape in the second exemplary embodiment.

FIG. 5 is a flowchart illustrating an example of the processing of the magnetic tape drive apparatus 20 when the magnetic tape 28 is loaded. It is assumed that the magnetic tape 28 is not set in the mounting unit 25 and both the first system adaptation unit 21 and the second system adaptation unit 22 are in the not-ready state by the state control unit 30. In this state, when the magnetic tape 28 is set in the mounting unit 25 of the drive mechanism 24, the drive mechanism 24 loads the magnetic tape 28 (step S101 illustrated in FIG. 5). The identification unit 31 receives information on the format read from the magnetic tape 28 by the loading, from the drive mechanism 24 (step S102). Then, the identification unit 31 determines whether the format of the loaded magnetic tape 28 is the file system format (step S103). The determination result, for example, is held in a storage unit (not illustrated) provided in the control unit 23 until at least the magnetic tape 28 is unloaded.

In the case that the identification unit 31 determines that the format of the magnetic tape 28 is the file system format by the determination operation, the state control unit 30 allows the first system adaptation unit 21 to be in the ready state (step S104) and the second system adaptation unit 22 to maintain the not-ready state. Furthermore, the state control unit 30 notifies the host apparatus 33 that the first system adaptation unit 21 is in the ready state, in other words, that the magnetic tape drive apparatus 20 is in a state in which read/write of data adapted to the file system is possible (step S105). At this time, the state control unit 30 may also notify the host apparatus 33 that the second system adaptation unit 22 is in the not-ready state, in other words, that the magnetic tape 28 of the format (adapted to the sequential access) unadapted to the file system has not been set.

In the case that the identification unit 31 determines that the format of the magnetic tape 28 is not the file system format, the state control unit 30 allows the second system adaptation unit 22 to be in the ready state and allows the first system adaptation unit 21 to maintain the not-ready state (step S106). Furthermore, the state control unit 30 notifies the host apparatus 33 that the second system adaptation unit 22 is in the ready state, in other words, that the magnetic tape drive apparatus 20 can perform data read/write for the magnetic tape 28 by the sequential access. Moreover, the state control unit 30 regards the first system adaptation unit 21 to be in the pseudo ready state, and notifies the host apparatus 33 that the first system adaptation unit 21 is in the ready state (the ready state and the state of no space and no file (step S107)).

Figure 6:
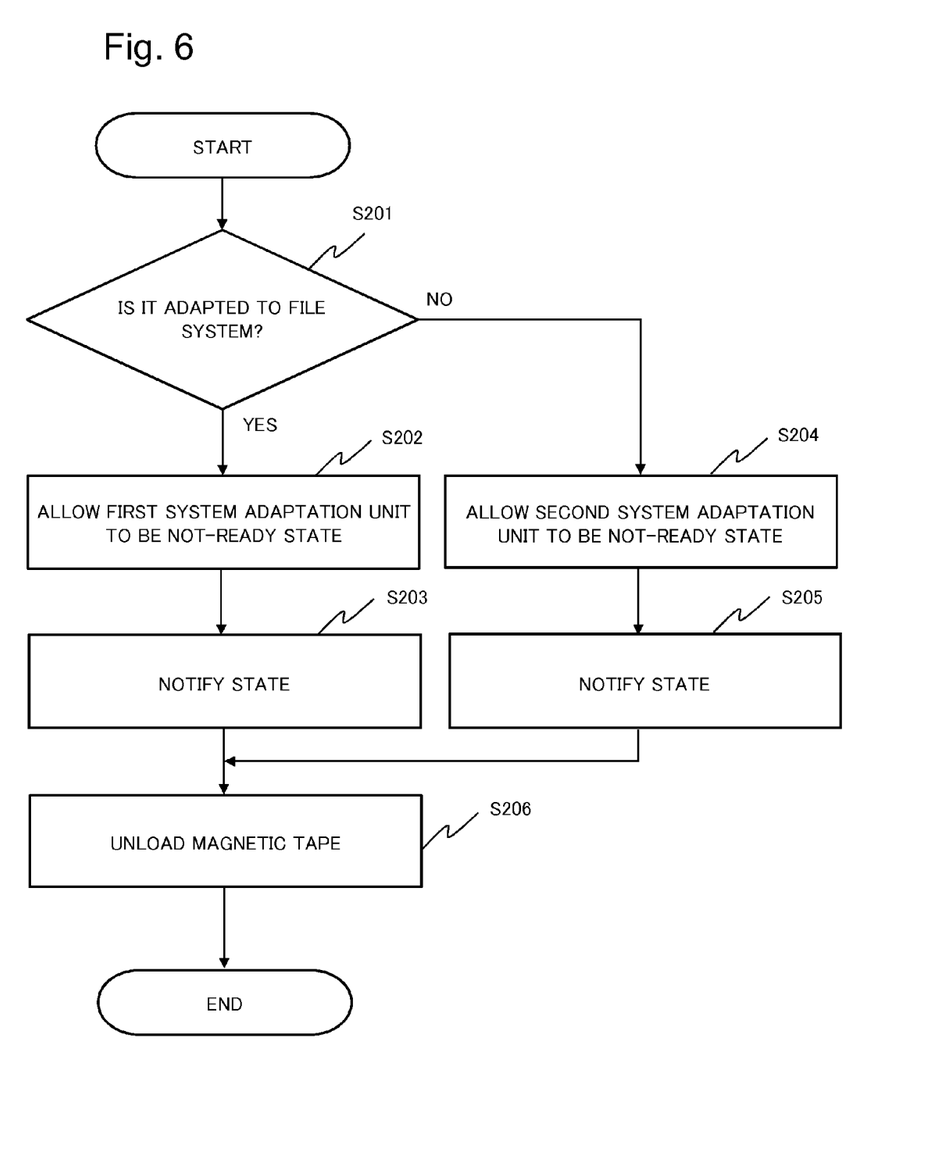
FIG. 6 is a flowchart illustrating an example of an unloading process of a magnetic tape in the second exemplary embodiment.

FIG. 6 is a flowchart illustrating an example of the processing of the magnetic tape drive apparatus 20 when a magnetic tape is unloaded. For example, when a command for taking out the magnetic tape 28 is received, the identification unit 31 determines whether the format of the magnetic tape 28 to be taken out is the file system format based on the information on the format acquired at the time of loading (step S201). In this way, in the case that the identification unit 31 determines that the format of the magnetic tape 28 is the file system format, the state control unit 30 changes the first system adaptation unit 21 from the ready state to the not-ready state (step S202). Furthermore, based on the change, the state control unit 30 regards the first system adaptation unit 21 to be in the pseudo ready state, and notifies the host apparatus 33 that the first system adaptation unit 21 is in the ready state (the ready state and the state of no space and no file) (step S203).

Furthermore, in the case that the identification unit 31 determines that the format of the magnetic tape 28 to be taken out is not the file system format by the determination operation of step S201, the state control unit 30 changes the second system adaptation unit 22 from the ready state to the not-ready state (step S204). Moreover, the state control unit 30 notifies the host apparatus 33 that the second system adaptation unit 22 has been changed to the not-ready state (the magnetic tape 28 of the format adapted to the sequential access is not loaded) (step S205). Then, the host apparatus 33 detects that the operation state of the magnetic tape drive apparatus 20 (the second system adaptation unit 22) has been changed, and continuously recognizes that the operation state of the first system adaptation unit 21 is still in the ready state.

Then, the drive mechanism 24 unloads the magnetic tape 28 to be taken out (step S206).

Even in the magnetic tape drive apparatus 20 of the second exemplary embodiment, the same effects as those of the first exemplary embodiment can be achieved. This is because the magnetic tape drive apparatus 20 includes the control unit 23 having the aforementioned function. The control unit 23 sets each of the first system adaptation unit 21 and the second system adaptation unit 22 to any one of the ready state and the not-ready state recognizable by the host apparatus 33 in response to the presence or absence and the format of the magnetic tape 28 to be read and written. That is, regardless of the presence or absence of the magnetic tape 28 and the format of the magnetic tape 28, the magnetic tape drive apparatus 20 deceives the host apparatus 33 as if the first system adaptation unit 21 is in the ready state, so that the first system adaptation unit 21 and the second system adaptation unit 22 can be simultaneously recognized by the host apparatus 33. Thus, the magnetic tape drive apparatus 20 can prevent the situation in which the recognition of the host apparatus 33 for the magnetic tape drive apparatus 20 is changed due to the change and the like of the magnetic tape 28. In other words, the magnetic tape drive apparatus 20 can achieve the effect that the appropriate operation depending on the format of a magnetic tape can be performed while the state in which the magnetic tape drive apparatus 20 is the apparatus adaptable to both of the file system and the sequential access is maintained as a state visible from the host apparatus 33.

Third Exemplary Embodiment

Hereinafter, a third exemplary embodiment according to the present invention will be described. In addition, in a description of the third exemplary embodiment, the same reference numerals are used to designate the same elements as those of the second exemplary embodiment, and a redundant description of the common parts will be omitted.

Figure 7:
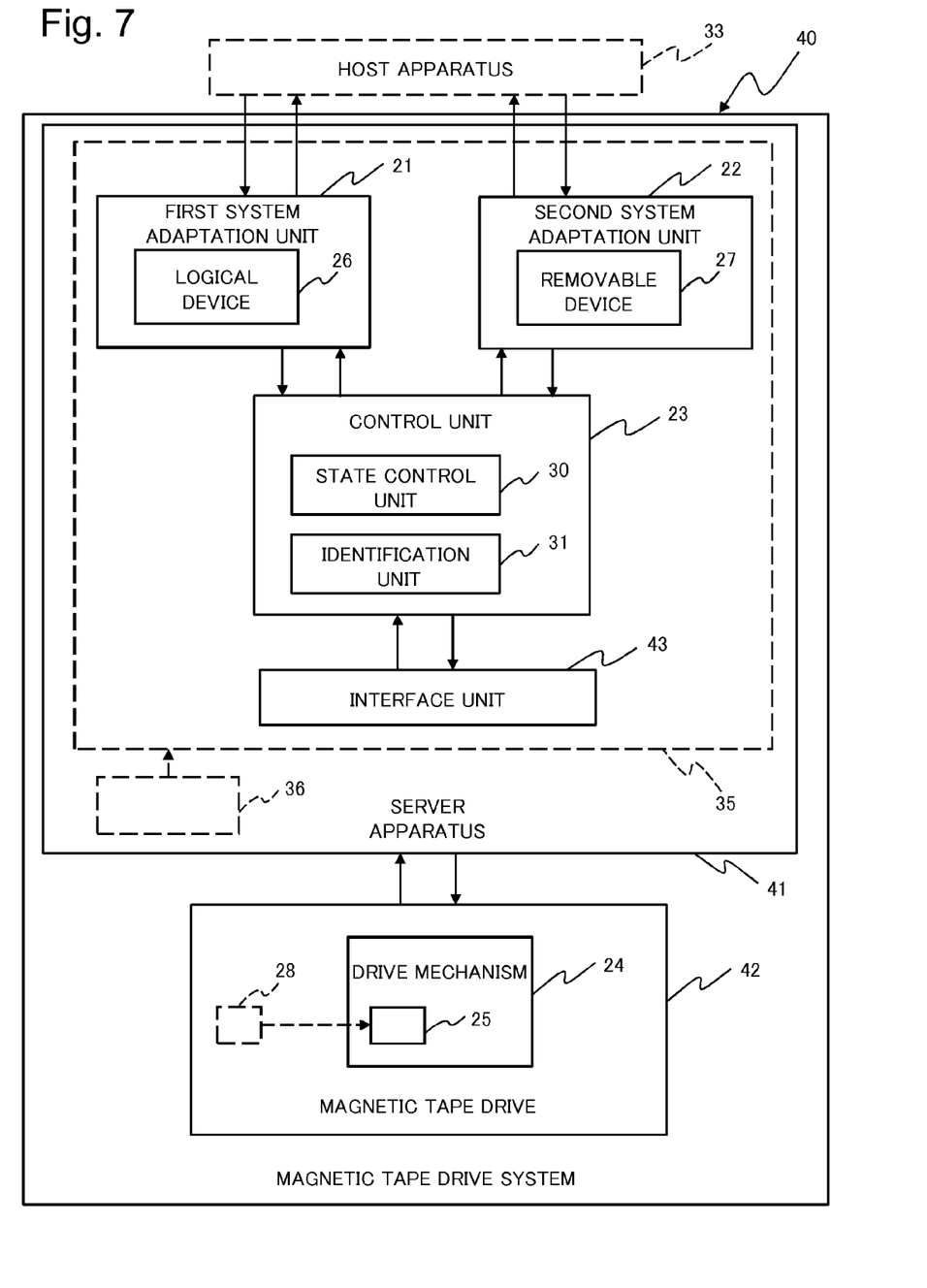
FIG. 7 is a block diagram simply illustrating a configuration of a magnetic tape drive system of a third exemplary embodiment according to the present invention.

FIG. 7 is a block diagram simply illustrating a configuration of a magnetic tape drive system of the third exemplary embodiment according to the present invention. A magnetic tape drive system 40 includes a server apparatus 41 and a magnetic tape drive 42. In the magnetic tape drive system 40, the magnetic tape drive 42 includes a mechanical mechanism that performs data read/write for a magnetic tape, and the server apparatus 41 has a function of controlling the mechanical mechanism.

That is, the magnetic tape drive 42 includes a drive mechanism 24. The drive mechanism 24 has the same configuration as that of the drive mechanism 24 described in the second exemplary embodiment, and has a mechanical configuration regarding loading and unloading of the magnetic tape 28. In addition, since the drive mechanism 24 in the third exemplary embodiment also has the same configuration as that of the drive mechanism 24 in the second exemplary embodiment, the same reference numeral is used, and a redundant description thereof will be omitted.

The server apparatus 41 is connected to the magnetic tape drive 42 through an information communication network. The server apparatus 41 includes an interface unit 43. By the interface unit 43, the server apparatus 41 can communicate with the magnetic tape drive 42 by a communication method suitable for the magnetic tape drive 42. For example, the interface unit 43 communicates with the magnetic tape drive 42 by SCSI that is a communication method. The server apparatus 41 issues a SCSI command toward the magnetic tape drive 42.

Moreover, the server apparatus 41 has a function of controlling the operation of the magnetic tape drive 42 and has a function of relaying data communication between the magnetic tape drive 42 and the host apparatus 33. That is, in the third exemplary embodiment, the server apparatus 41 includes the first system adaptation unit 21, the second system adaptation unit 22, and the control unit 23. The first system adaptation unit 21, the second system adaptation unit 22, the control unit 23 have the same functions as those of the first system adaptation unit 21, the second system adaptation unit 22, and the control unit 23 described in the second exemplary embodiment.

In addition, the server apparatus 41 includes a CPU (Central Processing Unit) 35 and a storage device 36 such as a memory. In the third exemplary embodiment, the storage device 36 stores software (computer program) such as middleware or a device driver indicating processing procedures of the first system adaptation unit 21, the second system adaptation unit 22, the control unit 23, and the interface unit 43. The software is executed by the CPU 35, so that the first system adaptation unit 21, the second system adaptation unit 22, the control unit 23, and the interface unit 43 are realized.

In the third exemplary embodiment, the server apparatus 41 connected to the host apparatus 33 includes the first system adaptation unit 21, the second system adaptation unit 22, and the control unit 23. Therefore, the magnetic tape drive system 40 can achieve the same effects as those of the second exemplary embodiment. This is because, regardless of the presence or absence of the magnetic tape 28 or the format of the magnetic tape 28, the magnetic tape drive system 40 deceives the host apparatus 33 as if the first system adaptation unit 21 is in the ready state, thereby allowing the first system adaptation unit 21 and the second system adaptation unit 22 to be simultaneously recognized by the host apparatus 33. Consequently, the magnetic tape drive system 40 can prevent the situation in which the recognition of the host apparatus 33 for the magnetic tape drive system 40 is changed due to the change and the like of the magnetic tape 28.

Fourth Exemplary Embodiment

Hereinafter, a fourth exemplary embodiment according to the present invention will be described. In addition, in a description of the fourth exemplary embodiment, the same reference numerals are used to designate the same elements as those of the second or third exemplary embodiment, and a redundant description of the common parts will be omitted.

Figure 8A:
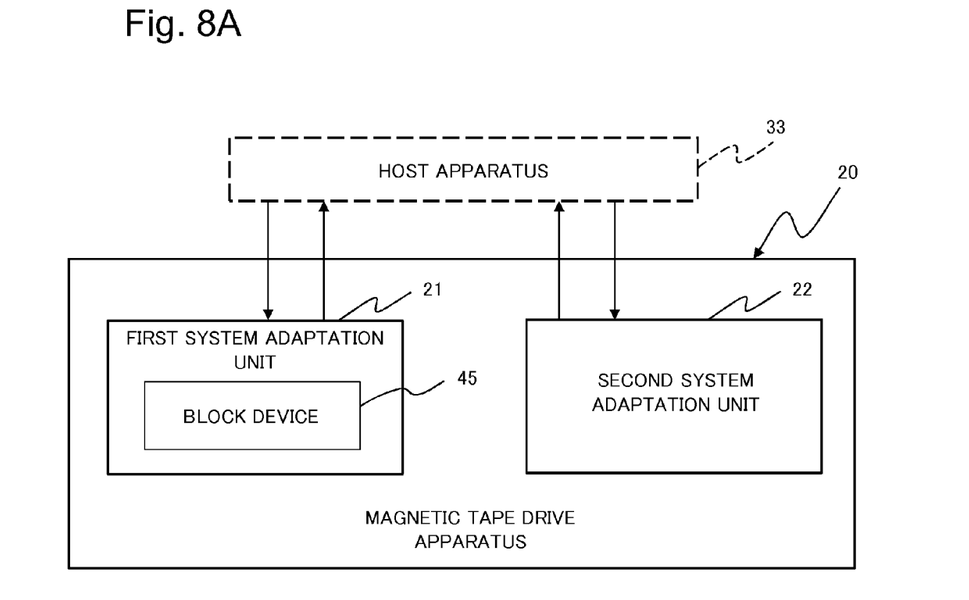
FIG. 8A is a block diagram explaining a configuration of a magnetic tape drive apparatus of a fourth exemplary embodiment according to the present invention.
Figure 8B:
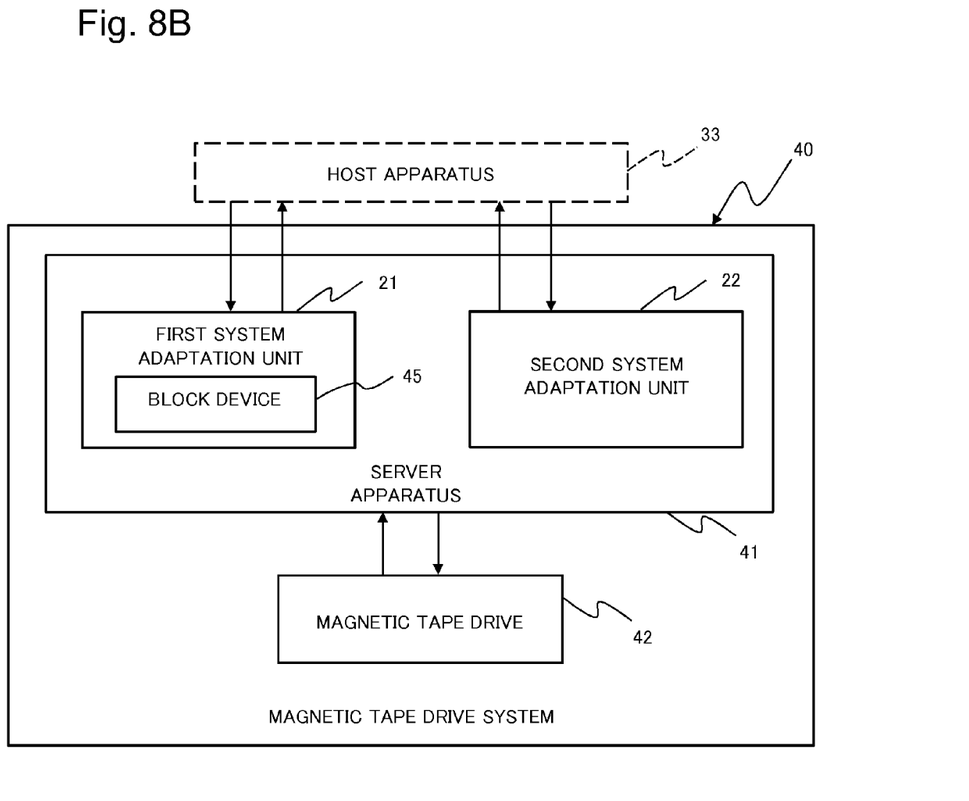
FIG. 8B is a block diagram explaining a configuration of a magnetic tape drive system of the fourth exemplary embodiment according to the present invention.

The fourth exemplary embodiment has the same configuration as that of the second exemplary embodiment or the third exemplary embodiment, except for differences to be described below. That is, in the fourth exemplary embodiment, as illustrated in FIG. 8A and FIG. 8B, the first system adaptation unit 21 includes a block device 45 instead of the logical device 26. In addition, in FIG. 8A and FIG. 8B, the removable device 27 of the second system adaptation unit 22, the control unit 23, the drive mechanism 24, and the interface unit 43 are not illustrated.

The first system adaptation unit 21 including the logical device 26 in the second exemplary embodiment or the third exemplary embodiment communicates data with the host apparatus 33 by a form of a file constructed by data in units of a plurality of blocks. On the other hand, the first system adaptation unit 21 including the block device (a random access device) 45 communicates data with the host apparatus 33 in block units by the function of the block device 45. In this case, the host apparatus 33 has a function of constructing a file based on the data in block units transmitted from the first system adaptation unit 21, and has a function of dividing the file into data in block units and outputting the data to the first system adaptation unit 21.

As in the fourth exemplary embodiment, in the case that the first system adaptation unit 21 communicates data with the host apparatus 33 in block units, an arbitrary file system can be constructed in the host apparatus 33 side. Furthermore, the host apparatus 33 is able to cope with an application that treats data through address designation. Therefore, the configuration in the fourth exemplary embodiment can expand the application range of a magnetic tape drive apparatus (a magnetic tape drive system).

Even in the fourth exemplary embodiment, by the first system adaptation unit 21, the second system adaptation unit 22, and the control unit 23, the same effects as those of the second exemplary embodiment or the third exemplary embodiment can be achieved. This is because, in response to the presence or absence and the format of the magnetic tape 28 to be read and written, the magnetic tape drive apparatus 20 and the magnetic tape drive system 40 set each of the first system adaptation unit 21 and the second system adaptation unit 22 to any one of the ready state and the not-ready state recognizable by the host apparatus 33. In this way, the magnetic tape drive apparatus 20 and the magnetic tape drive system 40 can allow the first system adaptation unit 21 and the second system adaptation unit 22 to be simultaneously recognized by the host apparatus 33. Thus, when the magnetic tape drive apparatus (the magnetic tape drive system) side is viewed from the host apparatus 33, regardless of the change of the magnetic tape 28, it is possible to prevent the situation in which the recognition of the host apparatus 33 for the magnetic tape drive apparatus 20 and the magnetic tape drive system 40 is changed due to the change and the like of the magnetic tape 28.

Fifth Exemplary Embodiment

Hereinafter, a fifth exemplary embodiment according to the present invention will be described. In addition, in a description of the fifth exemplary embodiment, the same reference numerals are used to designate the same elements as those of the second to fourth exemplary embodiments, and a redundant description of the common parts will be omitted.

Figure 9A:
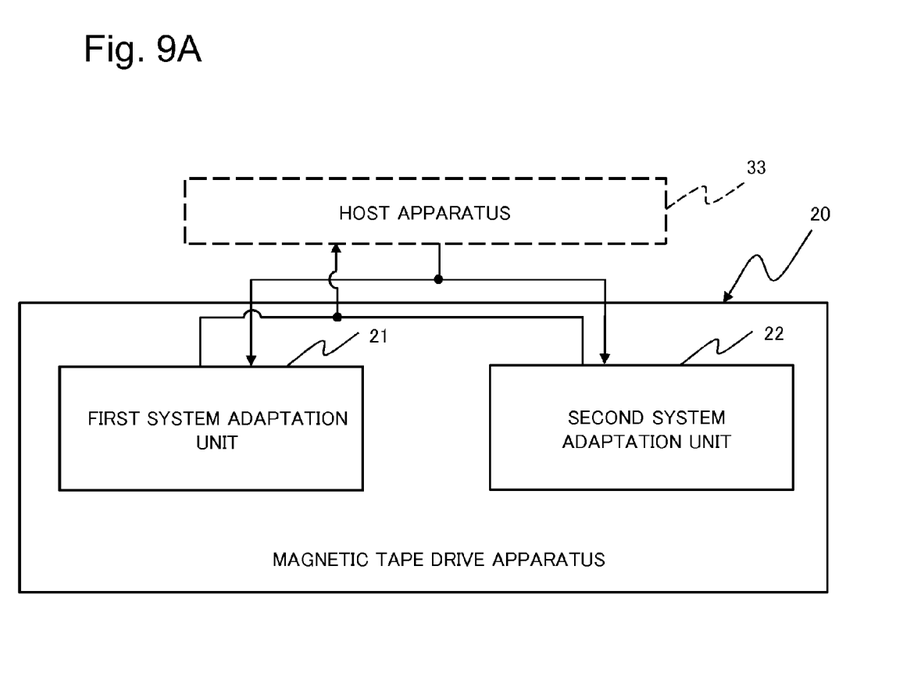
FIG. 9A is a block diagram explaining a configuration of a magnetic tape drive apparatus of a fifth exemplary embodiment according to the present invention.
Figure 9B:
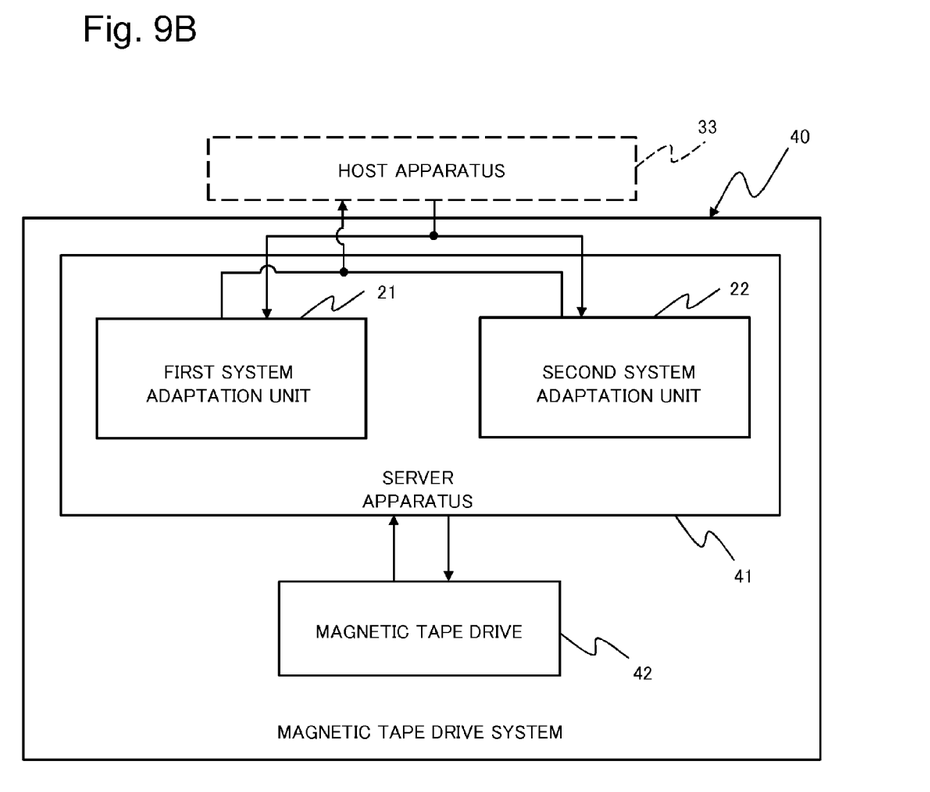
FIG. 9B is a block diagram explaining a configuration of a magnetic tape drive system of the fifth exemplary embodiment according to the present invention.

In the second to fourth exemplary embodiments, the first system adaptation unit 21 and the second system adaptation unit 22 communicate with the host apparatus 33 by separate communication methods. On the other hand, in the fifth exemplary embodiment, as illustrated in FIG. 9A and FIG. 9B, the first system adaptation unit 21 and the second system adaptation unit 22 communicate with the host apparatus 33 by a common communication method. For example, as the common communication method, there is the Ethernet (registered trademark) as a physical interface. In this case, for example, different TCP (Transmission Control Protocol) port numbers are assigned to the first system adaptation unit 21 and the second system adaptation unit 22. In this way, logically, the first system adaptation unit 21 and the second system adaptation unit 22 can separately establish connections with the host apparatus 33. In other words, the first system adaptation unit 21 communicates with the host apparatus 33 by a protocol adapted to the file system. The second system adaptation unit 22 communicates with the host apparatus 33 by a protocol of SCSI adapted to the sequential access.

Even in the fifth exemplary embodiment, the control unit 23 (the state control unit 30) is provided, so that the same effects as those of the second to fourth exemplary embodiments can be achieved. This is because, in response to the presence or absence and the format of the magnetic tape 28 to be read and written, the magnetic tape drive apparatus 20 and the magnetic tape drive system 40 set each of the first system adaptation unit 21 and the second system adaptation unit 22 to any one of the ready state and the not-ready state recognizable by the host apparatus 33, in response to the presence or absence and the format of the magnetic tape 28 to be read and written, the magnetic tape drive apparatus 20 and the magnetic tape drive system 40 set each of the first system adaptation unit 21 and the second system adaptation unit 22 to any of the ready state and the not-ready state recognizable by the host apparatus 33. In this way, the magnetic tape drive apparatus 20 and the magnetic tape drive system 40 can allow the first system adaptation unit 21 and the second system adaptation unit 22 to be simultaneously recognized by the host apparatus 33. Thus, when the magnetic tape drive apparatus (the magnetic tape drive system) is viewed from the host apparatus 33, regardless of the change of the magnetic tape 28, it is possible to prevent the situation in which the recognition of the host apparatus 33 for the magnetic tape drive apparatus 20 and the magnetic tape drive system 40 is changed due to the change and the like of the magnetic tape 28.

Other Exemplary Embodiments

In addition, the present invention is not limited to the first to fifth exemplary embodiments, and various exemplary embodiments can be employed. For example, in the third exemplary embodiment, one magnetic tape drive 42 is connected to the server apparatus 41. On the other hand, a plurality of magnetic tape drives 42 may also be connected to the server apparatus 41. Furthermore, the server apparatus 41 may also be connected to a plurality of host apparatuses 33. In the case that the server apparatus 41 are connected to a plurality of magnetic tape drives 42 and a plurality of host apparatuses 33, the server apparatus 41 may also have a configuration of controlling a connection relation between the magnetic tape drives 42 and the host apparatuses 33.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

The invention claimed is:

1. A magnetic tape drive apparatus comprising:
a first system adaptation unit that communicates with a read or write request source, which requests reading or writing of data, based on a method adapted to a file system;
a second system adaptation unit that communicates with the read or write request source, which requests reading or writing of data, based on a method adapted to a designated system other than the file system; and
a control unit that allows the first system adaptation unit to be in a ready state and the second system adaptation unit to be in a not-ready state in a case that a format of a magnetic tape to be read and written is adapted to the file system, allows the first system adaptation unit to be in the not-ready state and the second system adaptation unit to be in the ready state in a case that the format of the magnetic tape to be read and written is not adapted to the file system, and allows the first system adaptation unit and the second system adaptation unit to be in the not-ready state in a case that there is no magnetic tape to be read and written,
wherein, the control unit has a function of deceiving the read or write request source as if the first system adaptation unit is in the ready state even when the first system adaptation unit is in the not-ready state as well as the ready state.

2. The magnetic tape drive apparatus according to the claim 1, wherein the first system adaptation unit communicates data, which is a form of a file adapted to the file system, with the read or write request source.

3. The magnetic tape drive apparatus according to the claim 1, wherein the first system adaptation unit communicates data, which is a form of a block constituting a file adapted to the file system, with the read or write request source.

4. The magnetic tape drive apparatus according to the claim 1, wherein the first system adaptation unit and the second system adaptation unit communicate with the read or write request source by separate communication methods.

5. The magnetic tape drive apparatus according to the claim 1, wherein the first system adaptation unit and the second system adaptation unit communicate with the read or write request source by a common communication method.

6. The magnetic tape drive apparatus according to the claim 1, wherein, in the case that the first system adaptation unit is in the not-ready state, the control unit notifies the read or write request source that the first system adaptation unit is in the ready state, but there is no space in the magnetic tape.

7. A magnetic tape drive system comprising:
a magnetic tape drive that includes a mechanism to read and write data for a magnetic tape; and
a server apparatus that is connected to the magnetic tape drive via an information communication network and controls an operation of the magnetic tape drive,
wherein the server apparatus comprises:
a first system adaptation unit that communicates with a request source, which requests reading or writing of data in the magnetic tape, based on a method adapted to a file system;
a second system adaptation unit that communicates with the read or write request source, which requests reading or writing of data in the magnetic tape, based on a method adapted to a designated system other than the file system; and
a control unit that allows the first system adaptation unit to be in a ready state and the second system adaptation unit to be in a not-ready state in a case that a format of a magnetic tape to be read and written is adapted to the file system, allows the first system adaptation unit to be in the not-ready state and the second system adaptation unit to be in the ready state in a case that the format of the magnetic tape to be read and written is not adapted to the file system, and allows the first system adaptation unit and the second system adaptation unit to be in the not-ready state in a case that there is no magnetic tape to be read and written,
wherein, the control unit has a function of deceiving the read or write request source as if the first system adaptation unit is in the ready state even when the first system adaptation unit is in the not-ready state as well as the ready state.

8. A magnetic tape drive method comprising:
providing a first system adaptation unit that communicates with a read or write request source, which requests reading or writing of data in a magnetic tape, based on a method adapted to a file system, and a second system adaptation unit that communicates with the read or write request source, which requests reading or writing of data in the magnetic tape, based on a method adapted to a designated system other than the file system;
allowing the first system adaptation unit to be in a ready state and the second system adaptation unit to be in a not-ready state in a case that a format of a magnetic tape to be read and written is adapted to the file system;
allowing the first system adaptation unit to be in the not-ready state and the second system adaptation unit to be in the ready state in a case that the format of the magnetic tape to be read and written is not adapted to the file system;
allowing the first system adaptation unit and the second system adaptation unit to be in the not-ready state in a case that there is no magnetic tape to be read and written; and
deceiving the read or write request source as if the first system adaptation unit is in the ready state even when the first system adaptation unit is in the not-ready state as well as the ready state.

9. A magnetic tape drive apparatus comprising:
first system adaptation means for communicating with a read or write request source, which requests reading or writing of data, based on a method adapted to a file system;
second system adaptation means for communicating with the read or write request source, which requests reading or writing of data, based on a method adapted to a designated system other than the file system; and
control means for allowing the first system adaptation means to be in a ready state and the second system adaptation means to be in a not-ready state in a case that a format of a magnetic tape to be read and written is adapted to the file system, allowing the first system adaptation means to be in the not-ready state and the second system adaptation means to be in the ready state in a case that the format of the magnetic tape to be read and written is not adapted to the file system, and allowing the first system adaptation means and the second system adaptation means to be in the not-ready state in a case that there is no magnetic tape to be read and written, wherein, the control means has a function of deceiving the read or write request source as if the first system adaptation means is in the ready state even when the first system adaptation means is in the not-ready state as well as the ready state.

10. A magnetic tape drive system comprising:
a magnetic tape drive that includes a mechanism to read and write data for a magnetic tape; and
a server apparatus that is connected to the magnetic tape drive via an information communication network and controls an operation of the magnetic tape drive,
wherein the server apparatus comprises:
a first system adaptation means for communicating with a read or write request source, which requests reading or writing of data in the magnetic tape, based on a method adapted to a file system;
a second system adaptation means for communicating with the read or write request source, which requests reading or writing of data in the magnetic tape, based on a method adapted to a designated system other than the file system; and
a control means for allowing the first system adaptation means to be in a ready state and the second system adaptation means to be in a not-ready state in a case that a format of a magnetic tape to be read and written is adapted to the file system, allowing the first system adaptation means to be in the not-ready state and the second system adaptation means to be in the ready state in a case that the format of the magnetic tape to be read and written is not adapted to the file system, and allowing the first system adaptation means and the second system adaptation means to be in the not-ready state in a case that there is no magnetic tape to be read and written,
wherein, the control means has a function of deceiving the read or write request source as if the first system adaptation means is in the ready state even when the first system adaptation means is in the not-ready state as well as the ready state.

* * * * *